(12) United States Patent
Lam

(10) Patent No.: US 9,208,634 B2
(45) Date of Patent: Dec. 8, 2015

(54) ENHANCED SMART CARD USAGE

(75) Inventor: Alister Lam, Eastleigh (GB)

(73) Assignee: NXP B.V., Eindhoven (NL)

( * ) Notice: Subject to any disclaimer, the term of this patent is extended or adjusted under 35 U.S.C. 154(b) by 465 days.

(21) Appl. No.: 13/133,369

(22) PCT Filed: Dec. 9, 2009

(86) PCT No.: PCT/IB2009/055593
§ 371 (c)(1),
(2), (4) Date: Jun. 7, 2011

(87) PCT Pub. No.: WO2010/070539
PCT Pub. Date: Jun. 24, 2010

(65) Prior Publication Data
US 2011/0251955 A1    Oct. 13, 2011

(30) Foreign Application Priority Data

Dec. 19, 2008 (EP) .................................. 08106022

(51) Int. Cl.
*G07F 7/10*    (2006.01)
*G06F 21/32*   (2013.01)
(Continued)

(52) U.S. Cl.
CPC .............. *G07F 7/1008* (2013.01); *G06F 21/32* (2013.01); *G06F 21/35* (2013.01); *G06Q 20/105* (2013.01); *G06Q 20/32* (2013.01);
(Continued)

(58) Field of Classification Search
CPC .. G07F 7/1008; G06Q 20/341; G06Q 20/105; G06Q 20/3674; G06Q 20/4097; G06Q 20/363
USPC ............. 705/41; 713/168; 235/492, 379, 487, 235/375
See application file for complete search history.

(56) References Cited

U.S. PATENT DOCUMENTS 4,766,293 A * 8/1988 Boston ............................. 705/41
4,968,873 A * 11/1990 Dethloff et al. ................ 235/380
(Continued)

FOREIGN PATENT DOCUMENTS

CN    1296592 A    5/2001
CN    1954345 A    4/2007
(Continued)

OTHER PUBLICATIONS oFraud. The Facts 2008. The definitive overview of payment industry fraud and measures to prevent it. Katy Worobec, APACS. Head of Fraud Control. 2008. www.apacs.org.uk.*
(Continued)

*Primary Examiner* — Barbara Amelunxen

(57) ABSTRACT

A smart card (40) is distributed to a cardholder in a non-operative form, with a digital token. The token is sent, via a near field communication interface, to a wireless communication device (10) and forwarded to a verification entity (30) via a wireless communication interface. The communication device (10) receives content for the smart card and sends the content to the smart card (40) to render it into an operative form. A transaction on a cardholder's account is authorized by a process which comprises sending a notification of the transaction to a wireless communication device and notifying the user of the transaction via a user interface of the device. A user can approve the transaction by bringing the smart card within range of the communication device and sending a card identifier via a near field communication interface.

15 Claims, 6 Drawing Sheets

(51) Int. Cl.
*G06F 21/35* (2013.01)
*G06Q 20/10* (2012.01)
*G06Q 20/32* (2012.01)
*G06Q 20/34* (2012.01)

(52) U.S. Cl.
CPC ....... *G06Q 20/3226* (2013.01); *G06Q 20/3278* (2013.01); *G06Q 20/341* (2013.01); *G06Q 20/352* (2013.01); *G06Q 20/353* (2013.01); *G06Q 20/355* (2013.01); *G06Q 20/3552* (2013.01)

(56) References Cited

U.S. PATENT DOCUMENTS

| | | | |
|---|---|---|---|
| 5,594,493 A * | 1/1997 | Nemirofsky | 725/23 |
| 5,721,781 A * | 2/1998 | Deo et al. | 705/67 |
| 5,917,168 A * | 6/1999 | Nakamura et al. | 235/379 |
| 6,006,518 A * | 12/1999 | Geary | 60/398 |
| 6,591,229 B1 | 7/2003 | Pattinson et al. | 702/189 |
| 6,609,114 B1 * | 8/2003 | Gressel et al. | 705/50 |
| 6,687,714 B1 * | 2/2004 | Kogen et al. | 1/1 |
| 6,880,761 B1 * | 4/2005 | Ritter et al. | 235/492 |
| 6,896,182 B2 | 5/2005 | Sakaguchi | |
| 7,096,494 B1 * | 8/2006 | Chen | 726/9 |
| 7,392,388 B2 | 6/2008 | Keech | |
| 7,392,395 B2 | 6/2008 | Ginter et al. | |
| 7,392,404 B2 | 6/2008 | Montgomery et al. | |
| 7,489,045 B1 * | 2/2009 | Bradford et al. | 290/1 R |
| 7,962,369 B2 * | 6/2011 | Rosenberg | 705/26.1 |
| 7,984,515 B1 * | 7/2011 | Patsenker et al. | 726/31 |
| 8,335,731 B1 * | 12/2012 | Heller et al. | 705/35 |
| 8,689,287 B2 * | 4/2014 | Bohmer et al. | 726/2 |
| 2001/0037254 A1 | 11/2001 | Glikman | |
| 2001/0051920 A1 * | 12/2001 | Joao et al. | 705/41 |
| 2002/0020741 A1 * | 2/2002 | Sakaguchi | 235/380 |
| 2002/0184509 A1 * | 12/2002 | Scheidt et al. | 713/185 |
| 2002/0194145 A1 * | 12/2002 | Boucher et al. | 705/500 |
| 2003/0023467 A1 * | 1/2003 | Moldovan | 705/7 |
| 2003/0048614 A1 * | 3/2003 | Garnett et al. | 361/724 |
| 2003/0088777 A1 * | 5/2003 | Bae et al. | 713/181 |
| 2004/0002305 A1 | 1/2004 | Byman-Kivivuori et al. | |
| 2004/0069853 A1 * | 4/2004 | Aharonson | 235/454 |
| 2004/0250066 A1 * | 12/2004 | Di Luoffo et al. | 713/168 |
| 2005/0192779 A1 * | 9/2005 | Mertins et al. | 703/1 |
| 2005/0192780 A1 * | 9/2005 | Mertins et al. | 703/1 |
| 2005/0192827 A1 * | 9/2005 | Mertins et al. | 705/1 |
| 2005/0192859 A1 * | 9/2005 | Mertins et al. | 705/10 |
| 2005/0235148 A1 * | 10/2005 | Scheidt et al. | 713/168 |
| 2006/0160626 A1 * | 7/2006 | Gatto et al. | 463/43 |
| 2006/0218607 A1 * | 9/2006 | Hodzic et al. | 725/100 |
| 2007/0027789 A1 * | 2/2007 | Gleich | 705/36 R |
| 2007/0034700 A1 * | 2/2007 | Poidomani et al. | 235/492 |
| 2007/0106892 A1 * | 5/2007 | Engberg | 713/168 |
| 2008/0077527 A1 | 3/2008 | Choe et al. | |
| 2008/0148394 A1 * | 6/2008 | Poidomani et al. | 726/20 |
| 2008/0172279 A1 * | 7/2008 | Enis et al. | 705/8 |
| 2009/0019468 A1 * | 1/2009 | Ganesan et al. | 725/25 |
| 2009/0026767 A1 * | 1/2009 | Petrounevitch | 290/53 |
| 2009/0177458 A1 * | 7/2009 | Hochart et al. | 703/18 |
| 2009/0198618 A1 * | 8/2009 | Chan et al. | 705/66 |
| 2010/0005018 A1 * | 1/2010 | Tidwell | 705/35 |
| 2010/0088219 A1 * | 4/2010 | Knowles et al. | 705/37 |
| 2010/0100405 A1 * | 4/2010 | Lepore et al. | 705/7 |
| 2010/0228904 A1 * | 9/2010 | Buhr et al. | 711/102 |
| 2011/0041501 A1 * | 2/2011 | Gerard | 60/641.8 |
| 2011/0282807 A1 * | 11/2011 | Colello et al. | 705/412 |
| 2012/0101921 A1 * | 4/2012 | Anderson et al. | 705/30 |
| 2012/0102921 A1 * | 5/2012 | Sarsen et al. | 60/274 |
| 2012/0205451 A1 * | 8/2012 | Poidomani et al. | 235/492 |

FOREIGN PATENT DOCUMENTS

| | | | |
|---|---|---|---|
| EP | 0 745 961 A2 | 12/1996 | |
| EP | 1 041 520 A2 | 10/2000 | |
| EP | 1041520 A2 * | 10/2000 | G07F 7/08 |
| EP | 1 308 871 A2 | 5/2003 | |
| EP | 1308871 A2 * | 5/2003 | G06F 17/60 |
| EP | 1 595 382 A1 | 11/2005 | |
| EP | 1 699 004 A1 | 9/2006 | |
| EP | 1699004 A1 * | 9/2006 | G06Q 20/00 |
| GB | 2 358 500 A | 7/2001 | |
| GB | 2358500 A * | 7/2001 | G07F 7/10 |
| WO | 03/052544 A2 | 6/2003 | |
| WO | WO 03/052544 * | 6/2003 | |
| WO | 03/083737 A1 | 10/2003 | |
| WO | WO 03/083737 * | 10/2003 | G06F 17/60 |
| WO | WO 2004/068819 * | 8/2004 | H04L 29/06 |
| WO | WO 2004068819 A1 * | 8/2004 | H04L 29/06 |
| WO | 2005/119606 A1 | 12/2005 | |
| WO | WO 2005119606 A1 * | 12/2005 | G07F 7/10 |
| WO | WO 2008/049026 * | 4/2008 | H04L 9/00 |
| WO | WO 2008049026 A2 * | 4/2008 | H04L 9/00 |
| WO | 2008/141838 A2 | 11/2008 | |
| WO | WO 2008141838 A2 * | 11/2008 | G06Q 20/00 |
| WO | 2009/127991 A1 | 10/2009 | |

OTHER PUBLICATIONS

Fraud. The Facts 2008. The definitive overview of payment industry fraud and measures to prevent it. Katy Worobec, APACS. Head of Fraud Control. 2008. www.apacs.org.uk.*

Au, Richard et al., Cross-Domain one-shot authorization using smart cards, Copyright 2000 ACM 1-58113-203-4/00/0011 (pp. 220-227).*

APACS; "Fraud—The Facts 2008" 64 pages (2008).

International Search Report for Application PCT/IB2009/055593 (Feb. 25, 2010).

* cited by examiner

ENHANCED SMART CARD USAGE

This invention relates to smart cards.

Fraudulent use of smart cards, especially smart cards which are used for payment, such as credit and debit cards, is a significant problem. Various security measures have been introduced in an attempt to improve the security of smart card transactions. The EMV standard (known in the UK as "Chip and Pin"), helps to make cardholder present transactions more secure by requiring the cardholder, at the time of a transaction, to enter a secret Personal Identification Number (PIN) which is verified against a PIN held securely on a microchip embedded within the smart card. Other initiatives, such as the 3-D Secure protocol, are aimed at cardholder not present transactions. When a cardholder makes an online transaction with a merchant from a terminal, a secure communication path is established between the authorising bank and the terminal requesting that the cardholder enters a security code/secret answer before allowing the transaction to proceed.

WO 03/083737 A1 describes a system for notifying a registered cardholder when a transaction is made using their card. The notification is made to a hand held device (e.g. mobile phone) and the cardholder authorises the transaction by keying in a personal identification number to their device. Another system which authorises a user of a transaction is described in EP 0 745 961 A2.

One problem area of card security is that newly issued cards can be intercepted during delivery to the genuine cardholder. Security measures such as requiring a cardholder to contact the card provider to activate a new card before using it for the first time can reduce card theft, but this still remains a significant problem.

The present invention seeks to improve security and/or usability of smart cards.

A first aspect of the invention provides a method of preparing a smart card for use comprising, at a wireless communication device:

receiving, via a near field communication interface of the device, a digital token from a smart card;

sending the digital token to a verification entity, via a wireless communication interface;

receiving, via the communication interface, content for the smart card;

sending the content to the smart card via the near field communication interface.

Advantageously the smart card is issued in a non-operative form. The smart card stores none, or only some, of the content required for the card to make transactions. The smart card does store the digital token, which allows the card to be uniquely identified. The digital token stored on the smart card can be an identification code, such as a sequence of bits representing a string of numbers, letters, symbols or combination of these elements. Distributing a new card in this manner has an advantage of preventing stolen cards from being fraudulently used, as only the cardholder's wireless communication device can be used to retrieve the content which can put the card into an operative state.

Advantageously, the method comprises waiting for a user input before sending the digital token to the verification entity. The user input can be an item of personal data, such as a personal identification number or a biometric input. This adds a further level of security to the process, and further ensures that it is the authorised cardholder who received the card.

Another aspect of the present invention provides a method of authorising a smart card transaction on a cardholder's account comprising, at a wireless communication device:

receiving, via a wireless communication interface of the device, a notification from a verification entity of a transaction on the cardholder's account;

notifying the user of the transaction via a user interface of the device;

determining if a card identifier is received from a smart card via a near field communication interface;

sending an approval message to the verification entity, via the wireless communication interface, when the card identifier is received.

A cardholder, or joint cardholder, is notified of a transaction and is required to approve/authorise a transaction before it can proceed. A communication path is established between the cardholder's smart card and a verification entity, via a near field communication interface between the smart card and cardholder's wireless communication device, and a wireless communication interface between the cardholder's wireless communication device and a verification entity. This provides a form of proof that the person using the smart card is the authorised cardholder. The notification is only sent to the wireless communication device of the authorised cardholder (s).

Advantageously, the wireless communication device waits for a user input before sending the approval message to the verification entity. This has an advantage of confirming that the user has seen the notification of the transaction and wishes the transaction to proceed.

Advantageously, a further level of security can be achieved by collecting, at the wireless communication device, personal data of the cardholder such as a security (PIN) code or biometric data. This provides further assurance that the authorised cardholder is approving the transaction.

Another aspect of the present invention provides a method of configuring a smart card comprising, at a wireless communication device:

receiving, via a near field communication interface, at least one parameter value of the smart card;

executing an application on the communication device to allow a user to modify a value of the at least one parameter of the smart card;

updating, via the near field communication interface, the at least parameter with the modified value.

Some parameters of the smart card may be configured without approval of a verification entity in the network. Such parameters may include a reduction in a limit (e.g. per transaction limit, or account credit limit) to a value which is less than a limit which has already been approved. Other parameters of the smart card may require approval of a verification entity in the network before they can be changed. Advantageously, the method further comprises: sending the modified parameter to a verification entity, via a wireless communication interface; receiving, via the communication interface, an authorisation code; and wherein the updating, via the near field communication interface, of the at least parameter with the modified value is only performed in response to receiving the authorisation code.

Embodiments of the invention can be applied to smart cards which are used as payment cards (e.g. credit cards, debit cards, prepayment cards) or smart cards which are used for other purposes, such as identification cards and membership cards.

In at least some of the embodiments, a communication path is established between the cardholder's wireless communication device and a verification entity. An identifier of the wireless communication device can be used to verify the authenticity of the wireless communication device. This identifier can be a network number, or a code which is stored at a lower level of the communication device, such as a unique serial number of the integrated circuit which supports the near field communication interface.

The functionality described here can be implemented in software, hardware or a combination of these. The invention can be implemented by means of hardware comprising several distinct elements, and by means of a suitably programmed processing platform. Accordingly, another aspect of the invention provides machine-readable instructions (software) which, when executed by a processor, perform any of the described methods. The machine-readable instructions may be stored on an electronic memory device, hard disk, optical disk or other machine-readable storage medium. The software can be downloaded to a processing platform via a network connection.

Another aspect of the invention provides a wireless communication device comprising: a wireless communication interface; a near field communication interface; a user interface; and a processor which is configured to perform any of the described methods.

Another aspect of the invention provides a network entity comprising a processor which is configured to perform any of the server-side steps of the described methods.

Embodiments of the present invention will now be described, by way of example only, with reference to the accompanying drawings, in which.

Figure 1:
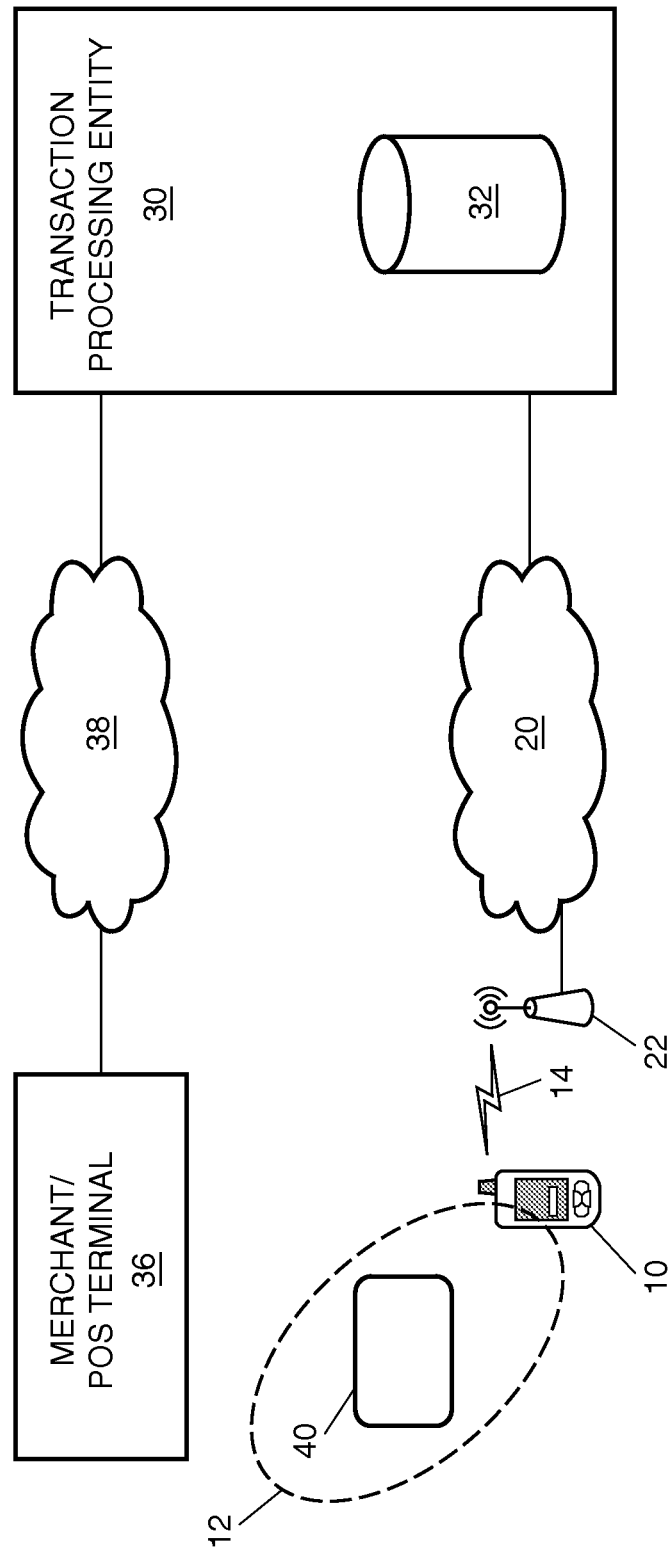
FIG. 1 shows a system for processing payment card transactions.

FIG. 1 shows a system in which embodiments of the invention can be performed. Some embodiments do not make use of all of the entities shown in FIG. 1. Communication device 10 is a personal wireless communication device of the cardholder. The personal wireless communication device 10 can be a mobile phone, personal digital assistant (PDA), laptop computer or any other device which the cardholder would normally carry with them. The communication device 10 has a wireless communication interface for communicating 14 with a wireless network 20, 22. The wireless network 20, 22 can be based on any existing, or future, wireless standards such as 2G, 3G, 4G, WiMAX, wireless LAN. The communication device 10 also has a near field communication (NFC) interface for communicating wirelessly with a smart card 40 over a short range 12. Typically, the range is less than 10 cm. A transaction processing entity 30 includes a store 32 of account data for cardholders. The transaction processing entity (TPE) 30 can be the card issuer, or an entity which authorises transactions on behalf of the card issuer. The transaction processing entity 30 is connected to the wireless network 20 which serves device 10 and to a network 38 which connects to a Point of Sale (POS) terminal 36. The POS terminal 36 is located at a merchant's premises, or any other point where a smart card user may make a transaction. Typically, the POS terminal 36 has a slot for receiving a smart card 40 and a card reader which can communicate with a micro- chip embedded in the card 40 via electrical connection to exposed contacts on the surface of the card. Alternatively, the POS terminal can communicate with the card by a contactless technique, such as NFC. For online retailers, there is no requirement to read a card at the time of purchase and therefore no need for a card-reading POS terminal. Instead, the merchant has an interface for receiving a cardholder's details (from an online shop front, or by telephone) and an interface with the transaction processing entity 30 (via network 38) for sending a transaction authorisation request and receiving a transaction authorisation/refusal.

Figure 2:
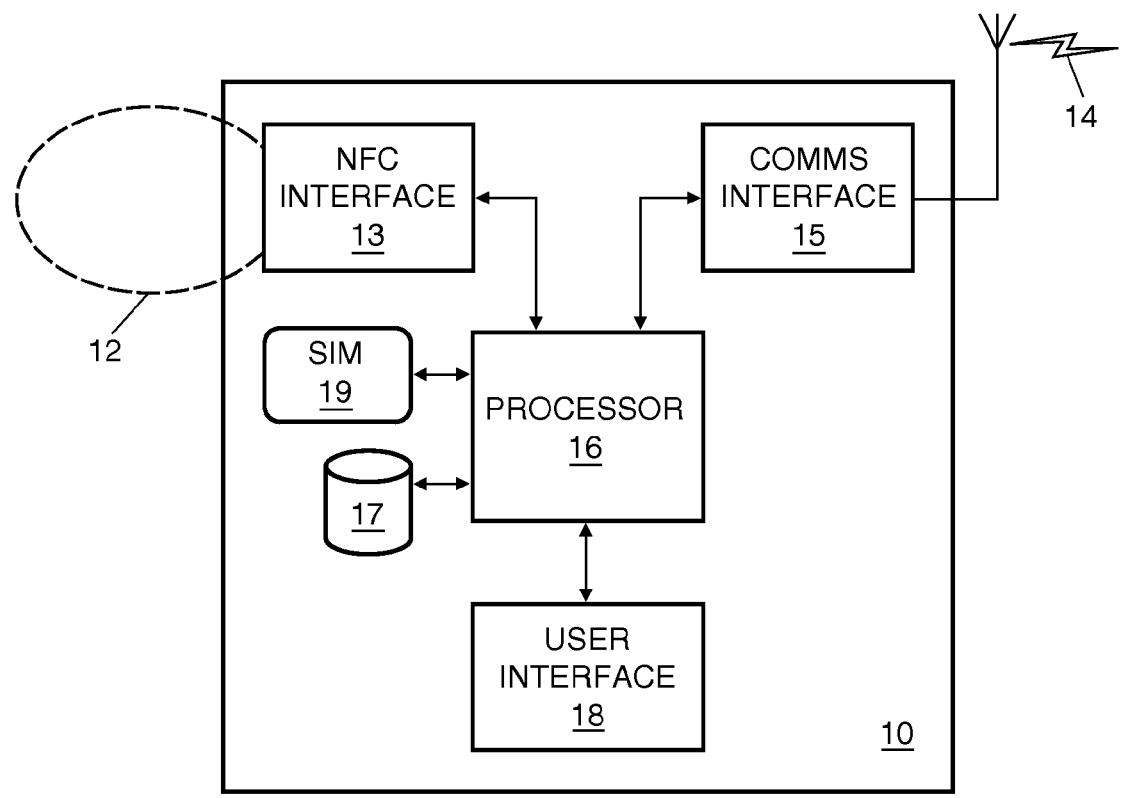
FIG. 2 shows a communication device for use in the system of FIG. 1.

The communication device 10 is shown in more detail in FIG. 2. A processor 16 connects to a communication interface 15, a near field communication interface 13 and a user interface 18. Communication interface 15 supports a wireless link to a communication network 20, 22. Near field communication interface 13 supports a short range, wireless, communication with a compatible NFC device embedded in a smart card. Advantageously, the NFC device embedded in the smart card is a passive device. The user interface can include a display, audio output, and keypad or touch screen. A memory 17 comprises a non-volatile store for operating software and data. Typically, the communication device 10 will have a Subscriber Identity Module (SIM) 19, or similar device, which stores the network identity of the communication device, such as the International Mobile Subscriber Identity (IMSI). Advantageously, the communication device 10 supports a secure protocol between the Subscriber Identity Module (SIM) of the communication device 10 and the NFC interface 13, such as the Single Wire Protocol (SWP).

The smart card typically comprises a plastic card with an embedded integrated circuit or chip which supports a contact, or contactless, communication with a payment POS terminal. The smart card also supports a NFC interface for communicating with a communication device 10. The NFC interface can be provided by the same embedded integrated circuit that is used to communicate with a POS terminal, or by an additional embedded integrated circuit. The embedded integrated circuit which supports the NFC interface includes a loop antenna.

A number of scenarios will now be described.
Scenario 1: Newly Issued Card

Figure 3:
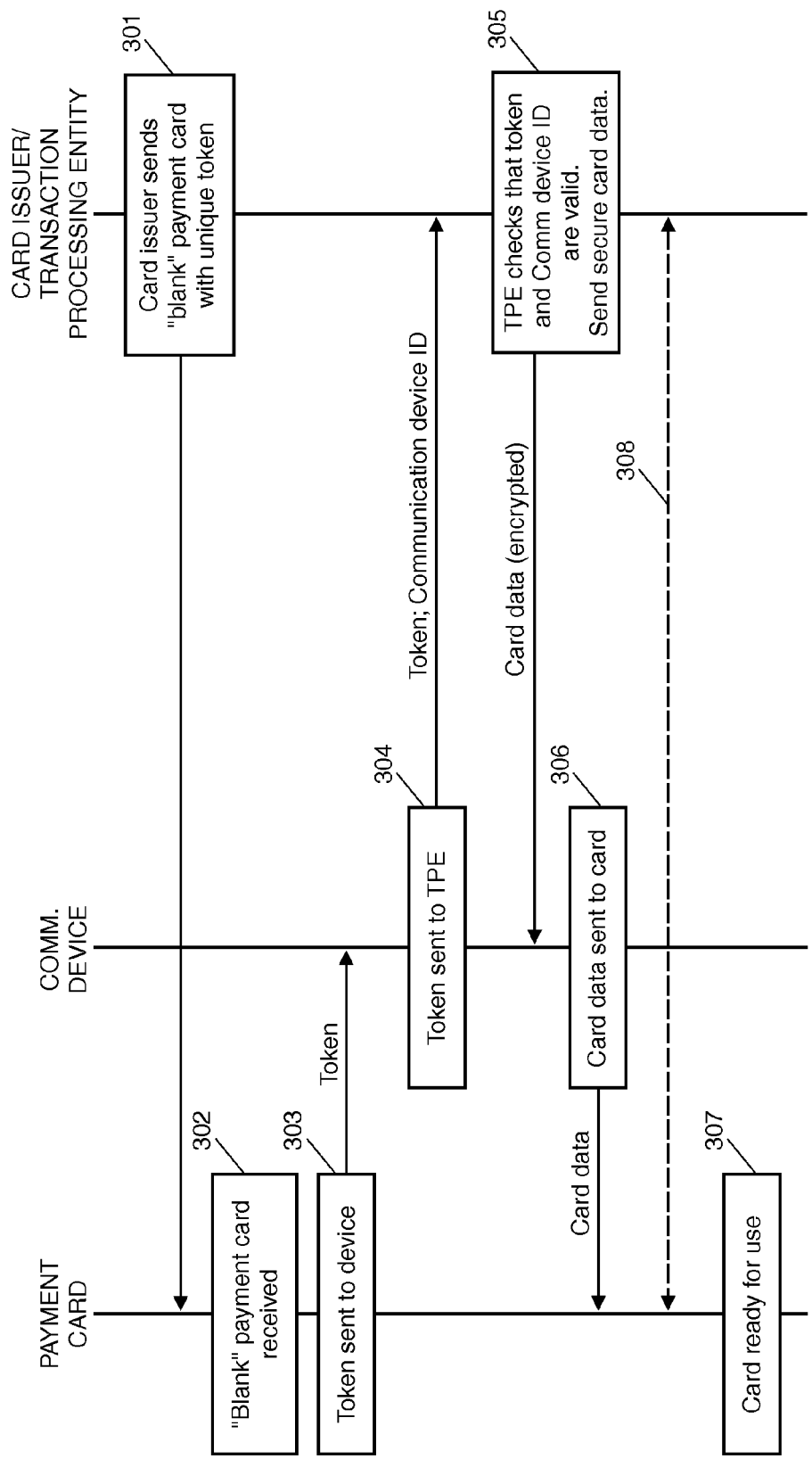
FIG. 3 shows a method of configuring a new payment card for use.

A source of payment card fraud is fraudulent interception of new payment cards. A customer registers for a new payment card and the card issuer posts the new payment card to the cardholder. The new card is not received by the cardholder but, instead, is intercepted by a third party and used fraudulently. FIG. 3 shows a method of processing a new payment card.

A card issuer issues a new card (step 301) in response to an application from a new customer, or as a planned replacement of an existing card which is approaching its expiry date. The card issuer issues a card which is non-operative, or "blank", in the sense that the microchip embedded in the smart card stores none, or only some, of the data normally required to make a transaction when interrogated by a POS terminal. The card stores a digital token or other unique identification code. The card is printed with the user's details, as normal. The user receives the card (step 302) in a conventional way, such as by mail. The user will also have pre-registered their NFC-enabled personal communication device 10 with the card provider, which installs some software on the device 10. The NFC interface 13 of communication device 10 repeatedly interrogates for the presence of a NFC device within range 12. When the user brings the card 40 within range 12, the NFC interface will read the unique ID token from the card (step 303). The token is then automatically sent via the communication interface 15 (e.g. via Short Message Service (SMS) or another communication mode) to the transaction processing entity 30 (step 304).

The transaction processing entity 30 receives the token (step 305). Checks are made at this point. The transaction processing entity 30 can verify that the mobile phone number (e.g. SIM card unique ID) of the communication device 10 matches the number stored at entity 30 as the registered cardholder, and that the received token matches the token sent to that cardholder. If this check fails, then it is most likely that a fraudulent attempt is being made to configure the blank card. Only if the result of the check is satisfactory, entity 30 then issues a secure and encrypted content to the mobile phone. The user is then instructed to bring their smart card within range of the device 10. The content is transferred to the smart card 40 via the NFC interface 13 (step 306). The smart card is now ready for use (step 307) and the payment processing entity 30 activates the account related to the new smart card.

Optionally, at step 308, the payment processing entity 30 awaits receipt of further data before activating the account. As an example, the smart card can re-hash the secure content or a token and send a checksum back to the device 10 which is then sent back to the verification service as an extra security and validity check. The smart card, and/or the device 10, can send a partial checksum, such as the most significant, or least significant, N bytes. Once this is completed, the verification service authorises the card for use.

Optionally, the user may be requested to enter a security code, which is known only to them, or a biometric input at the time of configuring the blank card. This can add a further level of security to protect against theft of a "blank" card and a user's registered communication device 10.

Scenario 2: Account Limit

A customer makes a purchase using a payment card, not realising that his/her partner (who is a joint cardholder) has recently made several transactions. As a result, the customer exceeds their account limit and subsequently receives an over limit charge from the card issuer (e.g. bank, financial institution, retail store provider).

This methods provides a means for which even if this did happen that the consumer can still have the opportunity to not authorise the requested transaction on their card account and therefore avoid being charged for an over limit spend.

Figure 4:
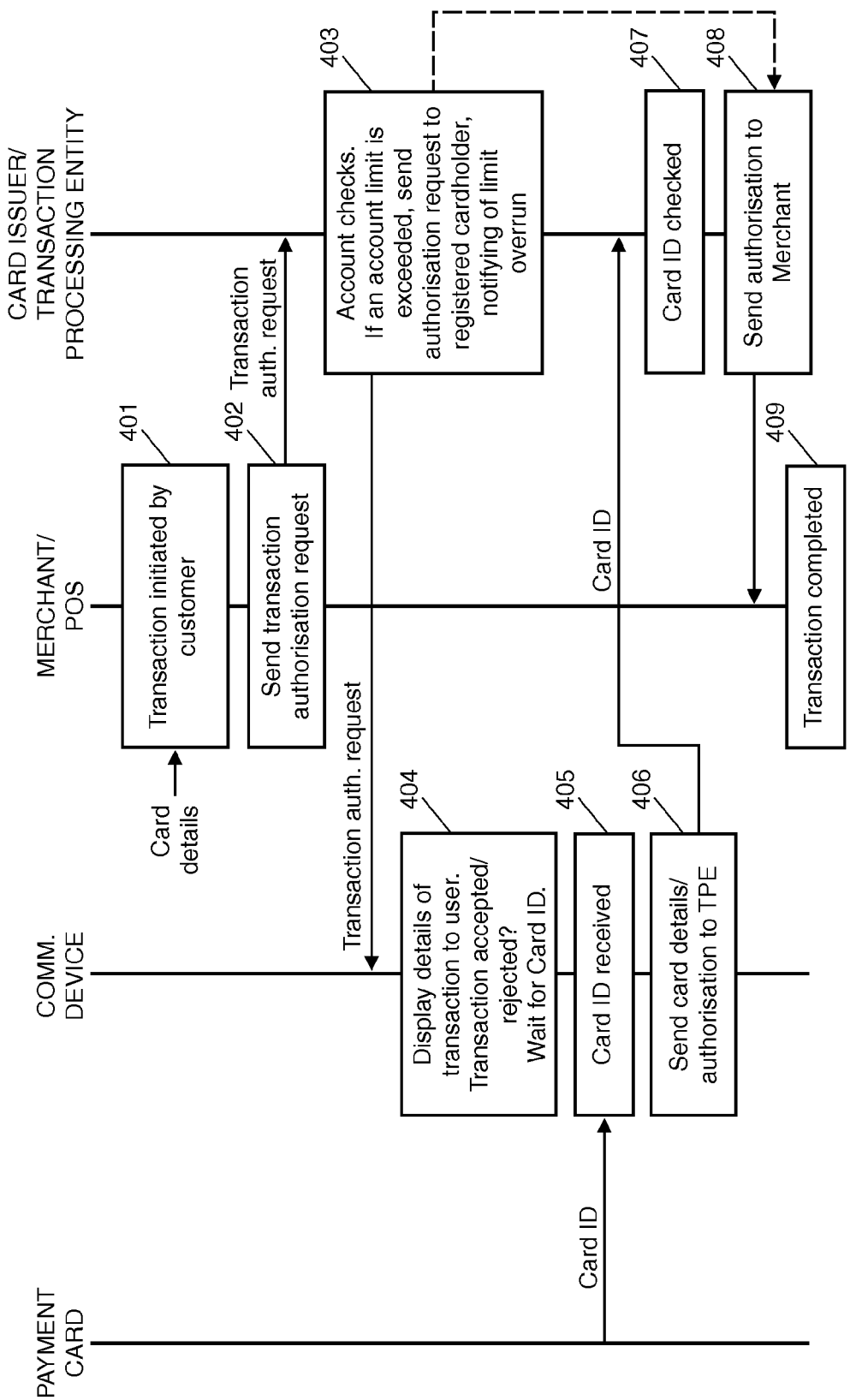
FIG. 4 shows a method of notifying a user when an account limit is exceeded.

FIG. 4 shows an improved way of processing a transaction when there is a breach of an account limit. A transaction is initiated by the cardholder, or by one of the joint cardholders (step 401). The transaction is made with a merchant, such as an online retailer. An authorisation request for the transaction is sent from the merchant to the transaction processing entity 30 (step 402). Entity 30 checks that the transaction is valid and obeys the account limits, such as one or more of: an individual transaction limit; an overall account limit; a date or time of day (step 403). If one or more account limits are exceeded (e.g. the purchase exceeds the individual transaction limit) a transaction authorisation request is sent to the registered communication device 10 of the cardholder. This gives the cardholder an opportunity to authorise the transaction before it can proceed. The request gives details of the transaction, such as the value of the transaction that has been attempted. The communication device 10 notifies a user of the transaction via the user interface (step 404). The communication device 10 then waits to receive an identifier from the payment card via the NFC interface 13. The cardholder positions their communication device 10 near to the smart card. When the communication device 10 interrogates the smart card 40 the identifier is sent from the smart card 40 to the communication device 10 (step 405).

The communication device 10 forwards the identifier to the transaction processing entity 30 (step 406). The transaction processing entity 30 checks the received Card ID (step 407). If the card ID matches the card ID stored in the cardholder's account, the transaction is authorised and a confirmation is sent to the merchant to complete the transaction (steps 408, 409). If the user does not want the transaction to proceed the user does not bring the smart card 40 within range of the communication device 10, and can terminate the transaction by an action taken on the user interface, such as a key press.

Optionally, if an account transaction was not exceeded, entity 30 can proceed immediately to step 408 to send an authorisation to the merchant and the cardholder is not informed of the transaction.

In this way, the cardholder is made aware of a transaction which exceeds an account limit. The account limit may have been exceeded because one joint cardholder has made purchases which another joint cardholder is unaware of.

Scenario 3: Cardholder not Present Transactions

Cardholder not present transactions include transactions made with an online shop and transactions which involve giving card details by telephone. In this type of transaction the smart card is not read by a POS terminal, and the security measures (signature, PIN) that would normally be used for cardholder present transactions are bypassed. This type of transaction is particularly vulnerable to abuse as fraudulently obtained card details can be more easily used to make a purchase.

Figure 5:
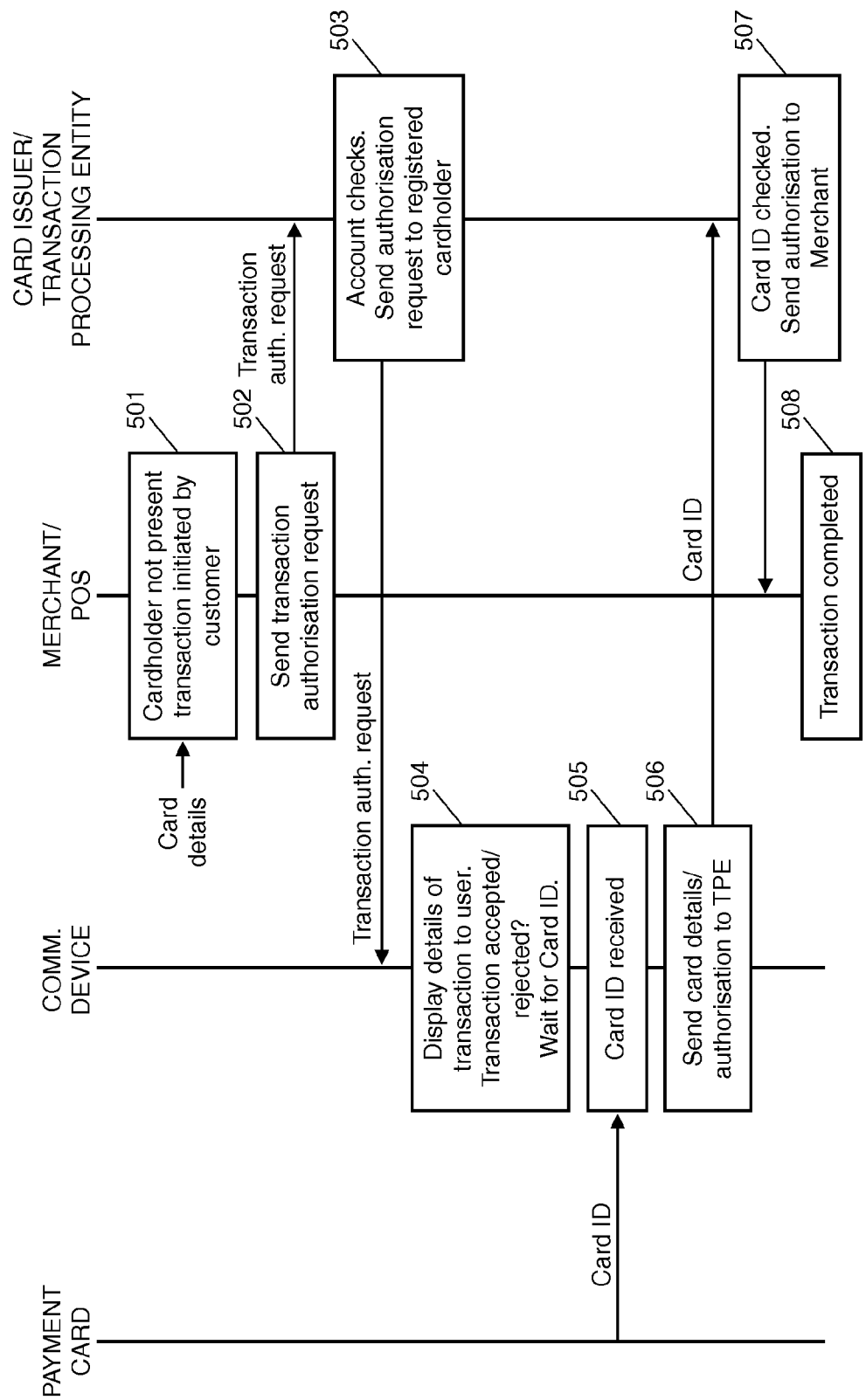
FIG. 5 shows a method of notifying a user when a transaction occurs on their account; and, FIG. 6 shows a method of configuring parameter values on a payment card.

FIG. 5 shows an improved way of processing cardholder not present transactions. Cardholder not present transactions can now be verified by the card owner via a communication path to the cardholder's communication device 10. A cardholder not present transaction is initiated by a person who may, or may not, be the registered cardholder (step 501). The transaction is made with a merchant, such as an online retailer. An authorisation request for the transaction is sent from the merchant to the transaction processing entity 30 (step 502). Entity 30 checks that the transaction is valid and obeys the account limits, such as an individual transaction limit and an overall account limit (step 503). A transaction authorisation request is sent to the registered communication device 10 of the cardholder. This request can give details of the transaction, such as the value of the transaction that has been attempted. The communication device 10 notifies a user of the transaction via the user interface 18 (step 504). The communication device 10 then waits to receive an identifier from the smart card via the NFC interface 13. The cardholder positions their communication device 10 near to the smart card. When the communication device 10 interrogates the smart card 40 the identifier is sent from the smart card 40 to the communication device 10 (step 505). The communication device 10 forwards the identifier to the transaction processing entity 30 (step 506). The transaction processing entity 30 checks the received Card ID (step 507). If the card ID matches the card ID stored in the cardholder's account, the transaction is authorised and a confirmation is sent to the merchant to complete the transaction (step 508). Alternatively, the card ID can be stored locally at the communication device 10 and a comparison of the card ID and stored card ID is made at the communication device, with an approval message being sent to the transaction processing entity 30 if the card ID matches the stored card ID. This has an advantage of not sending the card ID externally of the communication device.

In this way, the security of the transaction has been verified by the presence of the registered cardholder's communication device 10 at the same location as the smart card 40. If a transaction had been attempted by someone who had fraudulently obtained the card details, the cardholder will be notified at steps 503, 504 and the cardholder will not allow the transaction to proceed. Verification at steps 503-508 will fail. If the user did not want the transaction to proceed the user does not bring the smart card 40 within range of the communication device 10, and can terminate the transaction by an action taken on the user interface, such as a key press.

Advantageously, the user may be requested to positively authorise the transaction by interacting with the user interface 18 of the communication device 10. This can require the user to press a key on the key pad of the communication device 10, or enter a security code (PIN) which is known only to the cardholder, at the time of authorising the transaction. Other forms of authorisation can be used, such as a biometric input (e.g. voice or fingerprint). The security code or biometric data can be sent to the verification entity, for comparison with a stored security code or biometric data. Alternatively, the comparison can be made locally at the communication device, with an approval message only being issued if there is a match. This has an advantage of not sending the security code or biometric data externally of the communication device.

Scenario 4: Skimming of Card Details

Card details are copied, or "skimmed", at a point of sale and used to make a copy of the genuine smart card, or used to make cardholder not present transactions.

Fraudulent transactions, resulting from skimming of card details, are prevented by requiring an authorisation from the user's communication device 10 before the transaction can proceed in the manner shown in FIG. 5.

Scenario 5: Changing Card Parameters

One example scenario is that a consumer with a payment card wishes to make a transaction but is not fully confident about the security of the online or retail shop electronic payment system. Their payment account has a large account limit and they wish to reduce their potential fraudulent use exposure by reducing the account limit for this single transaction. However, this would mean calling up their payment card service provider and arguing the case for this single transaction (which is very unlikely to be successful) or having multiple payment cards of different account limits.

Figure 6:
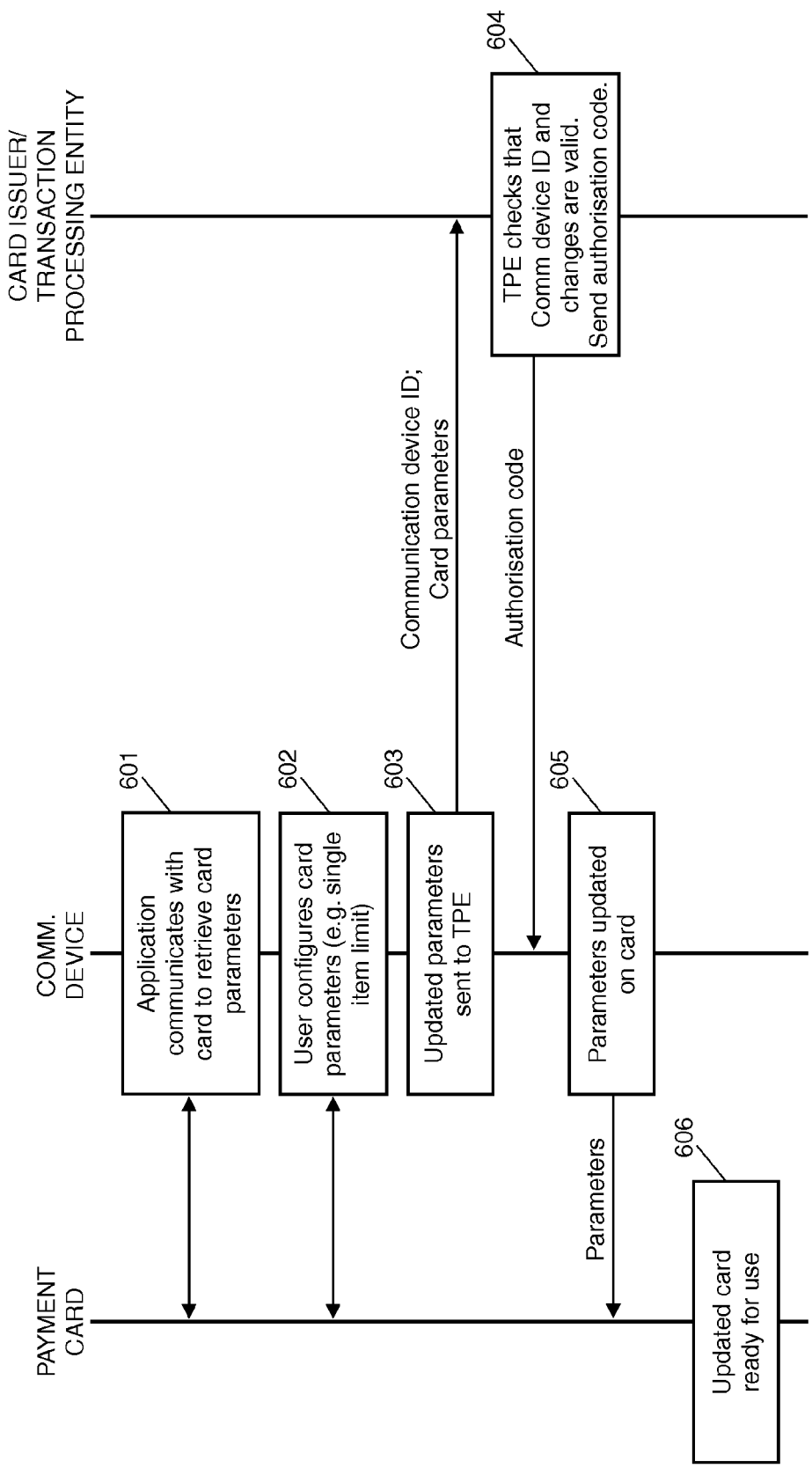

An example method is shown in FIG. 6 where a cardholder can change certain parameters of their smart card. The communication device 10 executes an application which allows the user to change some parameters of the smart card. The configurable parameters can be, for example, non-secure data such as: the account limit (from 0 to an agreed upper limit); the time and date or days the card is active on. The application can be provided by the card issuer and distributed to the communication device 10 by the wireless network 20, or via the internet, with the user connecting their communication device to a PC or wireless access point to download the application. The software application on the communication device 10 communicates with the smart card to retrieve the current values of parameters such as single item limit, account limit, date/time when card can be used etc. (step 601). The user configures the parameters as desired using the software application (step 602). When the user has finished configuring the parameters, they are sent to the transaction processing entity 30, along with the Communication device ID and Card ID (step 603). The TPE 30 checks that the received Communication device ID and Card ID are valid. The TPE 30 also checks that the changes to the parameters are valid. For example, the single item limit may be changed within a range up to the account limit, but no greater than the account limit. If the changes are valid, the TPE sends an authorisation code to the communication device 10 (step 604). The parameters are updated on the card in response to receiving the authorisation code (step 605). The updated card is then ready for use (step 606). If the communication device 10 does not receive the authorisation code, the card parameters are unchanged.

In FIG. 6, some (or all) of the changed parameters are sent to the TPE. This allows the TPE to check that the parameters have been changed within acceptable limits and also allows the TPE to update account data for the card to enforce the newly selected values of those parameters.

In an alternative embodiment, the card parameters can be configured by the communication device 10 without contacting the TPE. The card stores the new parameter values and a POS terminal, or the TPE, will enforce the values.

This approach can be used for "one time use credit cards" or to give user or the issuing card company greater control and feedback to the user e.g. if spending limit is exceed or near limit or suspect forgery is in place. This can be useful for theme parks with a closed payment system, i.e. a cash free system. In addition, the mobile phone can have a quick call feature or button to disable the credit card use.

When a user needs to use their smart card, as long as the use parameters (date/day, time, spending limit, single transaction limit, etc) match those on the verification service the transaction is valid and accepted. If the transaction is not valid, the user is sent an electronic message to the communication device 10 showing the user & retailer's details of the proposed transaction and asking them to accept it. Acceptance can be in a number of ways:
1) Via mobile phone network by way of replying to the SMS and therefore no further need to use the card or
2) By updating the card with the latest parameters from the mobile phone via NFC and then re-swiping the card at the retail payment point.

Another version is that the card issuer provides a smart card which stores a time-limited token. The token expires after a time limit and will no longer be valid for making transactions. It is also possible to cause the token to be erased after a time limit. For a true "one time use" scenario, the token can be erased after it is read for the first time. Without the token, the smart card cannot be used to make a transaction. A communication device 10 is configured to read the token from the card and then transmit the token back to the verification service. The terminal can also add further encryption details to link where it came from, making it difficult for a hacker to reuse the new token from another terminal.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The words "comprising" and "including" do not exclude the presence of other elements or steps than those listed in the claim. Where the system/device/apparatus claims recite several means, several of these means can be embodied by one and the same item of hardware.

In the description above, and with reference to the Figures, there is described a smart card distributed to a cardholder in a non-operative form, with a digital token. The token is sent, via a near field communication interface, to a wireless communication device and forwarded to a verification entity via a wireless communication interface. The communication device receives content for the smart card and sends the content to the smart card to render it into an operative form. A transaction on a cardholder's account is authorised by a process which comprises sending a notification of the transaction to a wireless communication device and notifying the user of the transaction via a user interface of the device. A user can approve the transaction by bringing the smart card within range of the communication device and sending a card identifier via a near field communication interface.

The invention claimed is:

1. A method of preparing a smart card for use comprising, at a wireless communication device:
   receiving, via a near field communication interface of the wireless communication device, a digital token from the smart card, wherein the smart card is issued in a non-operative form and the issued smart card lacks content required for an operative form;
   sending the digital token to a verification entity, via a wireless communication interface;
   receiving, via the wireless communication interface, content required for an operative form for the smart card; and
   sending the content to the smart card via the near field communication interface, wherein the smart card is rendered into the operative form.

2. The method according to claim 1, further comprising:
   receiving a data value calculated for the new content from the smart card via the near field communication interface; and
   sending the data value to the verification entity, via the wireless communication interface.

3. The method according to claim 1 further comprising:
   waiting for a user input before sending the digital token to the verification entity.

4. The method according to claim 3, wherein the user input is at least one of a personal identification number and a biometric input.

5. A method of preparing a smart card for use comprising:
   receiving, at a network entity, from a wireless communication device, a digital token which has been obtained from the smart card and a wireless communication device identifier, wherein the smart card is issued in a non-operative form and the issued smart card lacks content required for an operative form;
   verifying, at the network entity, that the wireless communication device identifier matches a registered wireless communication device of a cardholder and that the digital token matches a digital token used on the smart card issued to the cardholder; and
   sending content required for an operative form for the smart card to the wireless communication device from the network entity, wherein the smart card is rendered into the operative form.

6. A method of authorizing a smart card transaction on a cardholder's account comprising:
   receiving, at a wireless communication device, via a wireless communication interface of the wireless communication device, a notification from a verification entity of a transaction on the cardholder's account, wherein the smart card is issued in a non-operative form and the issued smart card lacks content required for an operative form;
   notifying the user of the transaction via a user interface of the wireless communication device;
   interrogating a smart card via a near field communication interface of the wireless communication device for a card identifier;
   sending an approval message to the verification entity, via the wireless communication interface of the wireless communication device, wherein the approval message comprises content required for the operative form; and
   receiving the card identifier, wherein the smart card is rendered into the operative form.

7. The method according to claim 6, further comprising:
   waiting for user input before sending the approval message to the verification entity.

8. The method according to claim 7, wherein the user input is at least one of: a personal identification number; a biometric input.

9. The method according to claim 6, wherein the notifying comprises:
   notifying the user of the transaction value.

10. The method according to claim 6, wherein the approval message contains the card identifier.

11. The method according to claim 6, wherein the communication device stores a card identifier and issues the approval message if the stored card identifier matches the card identifier received from the smart card.

12. A method of authorizing a smart card transaction on a cardholder's account comprising:
    sending, from a verification entity to a wireless communication device, a notification of a transaction on the cardholder's account, wherein the smart card is issued in a non-operative form and the issued smart card lacks content required for an operative form;
    receiving, at the verification entity, an approval message from the wireless communication device, wherein the approval message includes content required for the operative form; and
    receiving a card identifier from the smart card by the wireless communication device, wherein the smart card is rendered into the operative form.

13. The method according to claim 12, wherein the approval message includes at least one of: a personal identification number or a biometric input which has been received at a user interface of the wireless communication device.

14. A wireless communication device comprising:
    a wireless communication interface;
    a near field communication interface;
    a user interface; and
    a processor which is configured to perform the method according to the following steps:
    receiving, via a near field communication interface of the wireless communication device, a digital token from the smart card, wherein the smart card is issued in a non-operative form and the issued smart card lacks content required for an operative form;
    sending the digital token to a verification entity, via a wireless communication interface;
    receiving, via the wireless communication interface, content required for an operative form for the smart card; and
    sending the content to the smart card via the near field communication interface, wherein the smart card is rendered into the operative form.

15. A computer program product stored on a non-transitory computer readable medium causing a processor to execute the steps of [the method of claim 1]
    receiving, via a near field communication interface of the wireless communication device, a digital token from the smart card, wherein the smart card is issued in a non-operative form and the issued smart card lacks content required for an operative form;
    sending the digital token to a verification entity, via a wireless communication interface:
    receiving, via the wireless communication interface, content required for an operative form for the smart card; and sending the content to the smart card via the near field communication interface, wherein the smart card is rendered into the operative form.

* * * * *